United States Patent
Watanabe et al.

(10) Patent No.: US 7,659,030 B2
(45) Date of Patent: Feb. 9, 2010

(54) CELL STRUCTURE HAVING IMPROVED HEAT DISSIPATION AND LOWER VIBRATIONS

(75) Inventors: Kyouichi Watanabe, Yokohama (JP); Takaaki Abe, Yokohama (JP); Osamu Shimamura, Yokohama (JP); Takamitsu Saito, Yokohama (JP); Hajime Sato, Yokohama (JP); Kenji Hosaka, Yokosuka (JP); Hideaki Horie, Yokosuka (JP)

(73) Assignee: Nissan Motor •Co., Ltd., Yokohama-shi (JP)

( * ) Notice: Subject to any disclaimer, the term of this patent is extended or adjusted under 35 U.S.C. 154(b) by 823 days.

(21) Appl. No.: 11/284,089

(22) Filed: Nov. 22, 2005

(65) Prior Publication Data
US 2006/0127763 A1 Jun. 15, 2006

(30) Foreign Application Priority Data
Nov. 22, 2004 (JP) ............................. 2004-337490
Nov. 11, 2005 (JP) ............................. 2005-326870

(51) Int. Cl.
*H01M 4/02* (2006.01)
(52) U.S. Cl. ..................... 429/209; 429/247; 429/162; 429/210
(58) Field of Classification Search ................ 429/209, 429/176, 210, 128, 231.8, 254, 162, 247, 429/231.1
See application file for complete search history.

(56) References Cited

U.S. PATENT DOCUMENTS 5,958,088 A 9/1999 Vu et al.
6,696,197 B2 2/2004 Inagaki et al.
6,972,164 B2 12/2005 Nemoto et al.
2003/0129496 A1 * 7/2003 Kasai et al. .............. 429/231.1
2004/0091771 A1 5/2004 Hosaka et al.
2004/0101752 A1 * 5/2004 Oosawa et al. .............. 429/217
2004/0106040 A1 * 6/2004 Fukuoka et al. ............. 429/212
2004/0151987 A1 * 8/2004 Kawase et al. .............. 429/338

FOREIGN PATENT DOCUMENTS

EP 0 599 137 A1 6/1994
EP 1 333 520 A2 8/2003
JP 2004-273254 A 9/2004

OTHER PUBLICATIONS

"Shore (Durometer) Hardness Testing of Plastics", retrieved from 3 pgs.

* cited by examiner

*Primary Examiner*—Raymond Alejandro
(74) *Attorney, Agent, or Firm*—Foley & Lardner, LLP

(57) ABSTRACT

A cell structure that can improve heat dissipation and the vibration-proofing nature of a cell without using a cooling medium while keeping the rigidity and the discharge current quantity of the cell includes at least one electrode having a positive pole active material layer, a current collector and a negative pole active material layer. The cell structure also includes a separator provided between each electrode; and a casing. The cell structure satisfies the inequality:

$$\frac{S}{c \times 1000} > \frac{b \times 1000}{S}$$

wherein b (mm) indicates a short-side length of the electrode, S ($m^2$) indicates an electrode area, c (mm) indicates a cell structure thickness and 1000 ($m^2$/mm) is a constant. The separators have a different Shore A hardness and the separator having the lowest Shore A hardness is placed at a center of the cell structure.

19 Claims, 9 Drawing Sheets

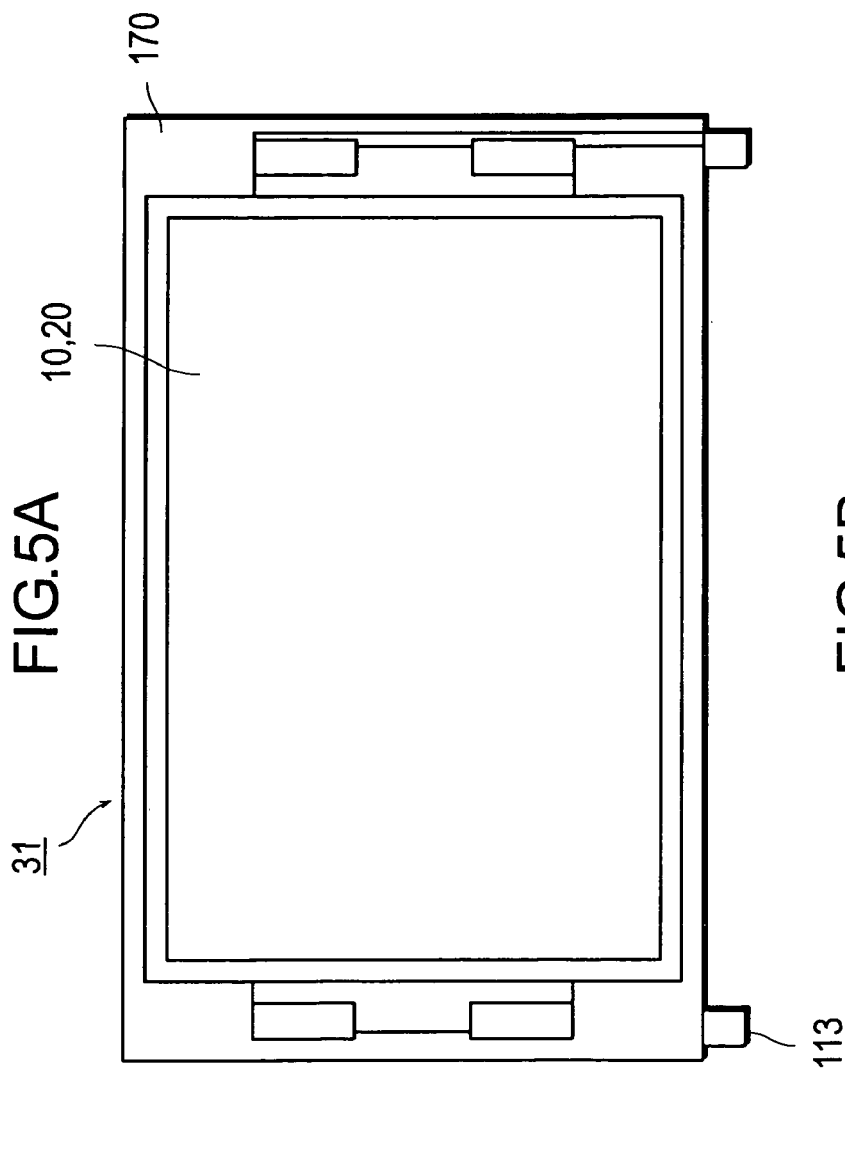
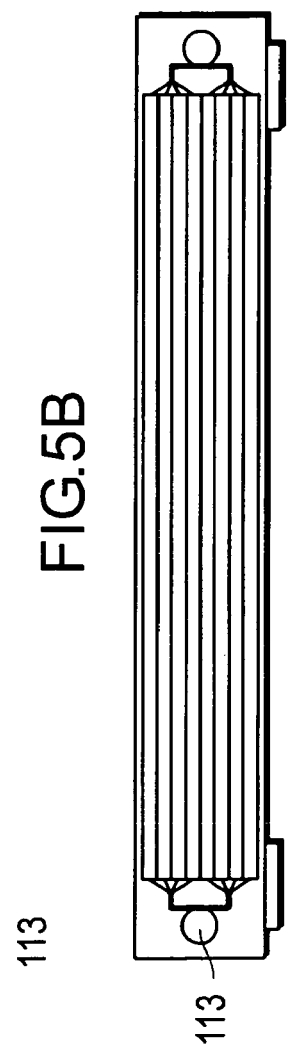
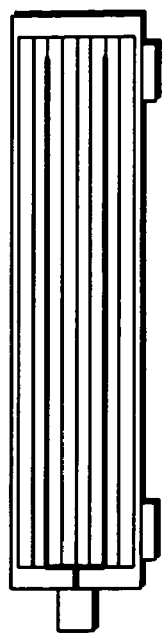

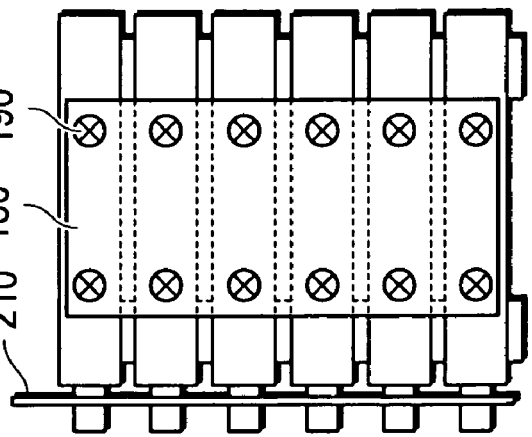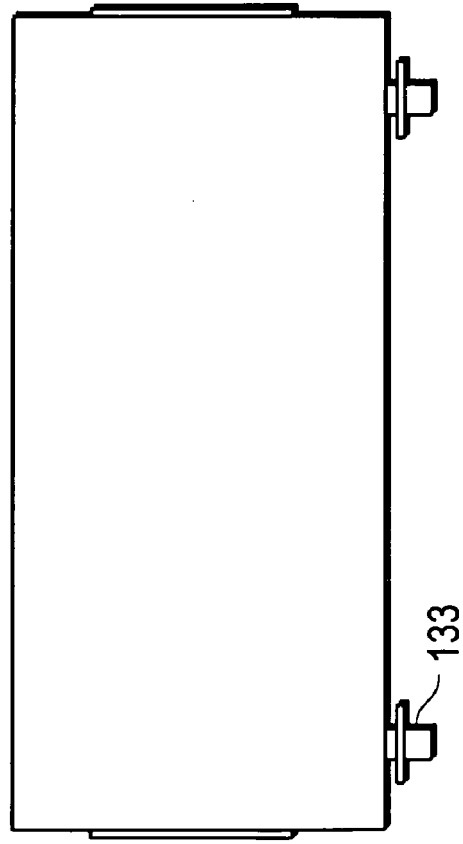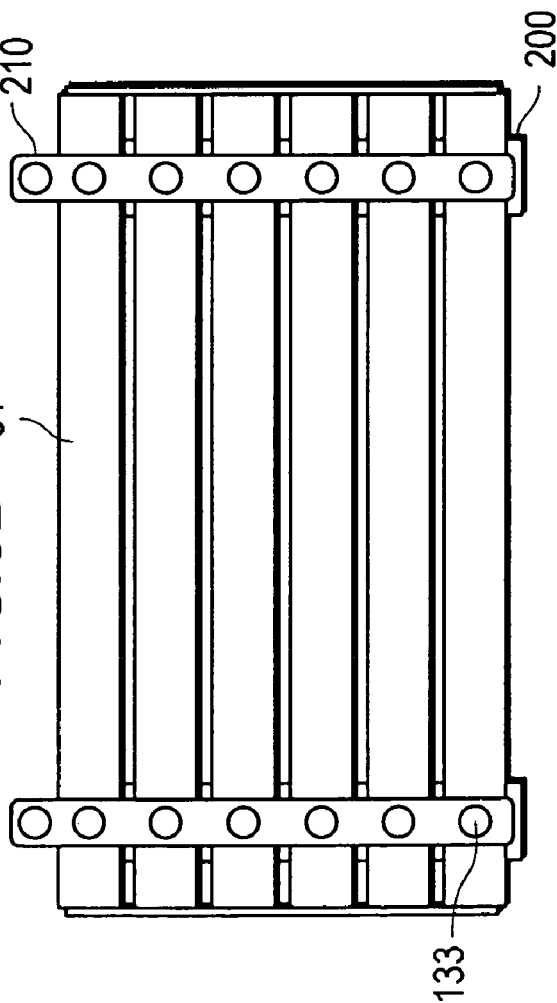

CELL STRUCTURE HAVING IMPROVED HEAT DISSIPATION AND LOWER VIBRATIONS

BACKGROUND OF THE INVENTION

1. Field of the Invention

The present invention relates to cell structure and in particular, relates to effects of cell structure on heat dissipation and vibration-proofing nature.

2. Description of the Related Art

To realize a cell with higher power and higher capacity, it is effective to make electrode area larger. Especially when a cell is used as a mobile power source for vehicles, at least 0.1 to 2 $m^2$ of electrode area is required in case of a lithium-ion cell using an electrode with conventional performance.

A cell with large electrode area has required large thickness thereof to secure cell rigidity and easy handling.

On the other hand, a thick cell has posed a problem of excessive temperature elevation in a cell caused by insufficient heat dissipation relative to heat generation in a cell. When temperature is too high in a cell, cell components are decomposed by heat, resulting in promotion of cell degradation. Particularly in case of a bipolar cell, there is a risk that thermal expansion in the cell causes a casing thereof to rupture, resulting in splashing of an electrolyte solution, and this splashed electrolyte sticks to mounted devices, leading to damage thereof. There is another risk, when a thick cell is used at a place liable to receive vibration such as a mobile power source, of undergoing resonance leading to delamination of component layers of a cell.

Cell performance may badly be impaired by degradation of a cell and delamination of component layers. Therefore, it is necessary to take a measure for heat dissipation and vibration-proofing nature of a cell. A conventional method includes a method for suppressing temperature rise in a cell by controlling discharge current quantity and a method for dissipating heat using cooling medium which is disclosed in JP-A-2004-273254. No invention has been found that aims at protection of cell components by lowering vibration of a cell.

In a method for using cooling medium, however, it is necessary to incorporate a structure for arranging thereof and when liquid cooling medium is used, a preventive device against a short circuit of liquid is additionally required. As a result, such a problem arises as increase in cell production steps or requirement of an unnecessarily large cell.

Therefore, it is an object of the present invention to improve heat dissipation and vibration-proofing nature of a cell without using cooling medium while keeping rigidity and discharge current quantity of a cell.

SUMMARY OF THE INVENTION

After having studied cell structure in detail, the present inventors have found that the above problems can be solved by controlling short-side length and area of an electrode and thickness of a cell structure and have completed the present invention.

In an aspect, the present invention provides:

(1) A cell structure characterized by comprising at least a positive pole active material layer, a current collector, a negative pole active material layer, an electrolyte layer and a casing, and satisfying the following inequality (1):

$$\frac{S}{c \times 1000} > \frac{b \times 1000}{S} \tag{1}$$

wherein b (mm) indicates short-side length of an electrode; S ($mm^2$) indicates electrode area; and c (mm) indicates thickness of a cell structure.

(2) In a further aspect, the present invention provides a combined cell formed by connecting not less than 2 cell structures described in the above aspect (1), in series and/or parallel.

(3) In a still further aspect, the present invention provides a vehicle equipped with a cell structure described in the above aspect (1) or a combined cell described in the above aspect (2).

According to the present invention, a cell structure having superior heat dissipation and vibration-proofing nature can be manufactured.

BRIEF DESCRIPTION OF THE DRAWINGS

FIG. 5A is a schematic plan view of appearance of a combined cell module.

FIG. 5B is a front elevation view of the schematic plan view of FIG. 5A.

FIG. 5C is a side elevation view of the schematic plan view of FIG. 5A.

FIG. 6A is a schematic plan view of combined-cell appearance.

FIG. 6B is a front elevation view of the schematic plan view of FIG. 6A.

FIG. 6C is a side elevation view of the schematic plan view of FIG. 6A.

DESCRIPTION OF THE PREFERRED EMBODIMENT

The first aspect of the present invention is a cell structure characterized by comprising at least a positive pole active material layer, a current collector, a negative pole active material layer, an electrolyte layer and a casing, and satisfying the following inequality (1):

$$\frac{S}{c \times 1000} > \frac{b \times 1000}{S} \qquad (1)$$

wherein b indicates short-side length of an electrode; S indicates electrode area; and c indicates cell structure thickness. The present invention can be applied to every cell structure, but is particularly effective for a cell structure having laminated structure such as a lithium-ion cell.

Figure 1A:
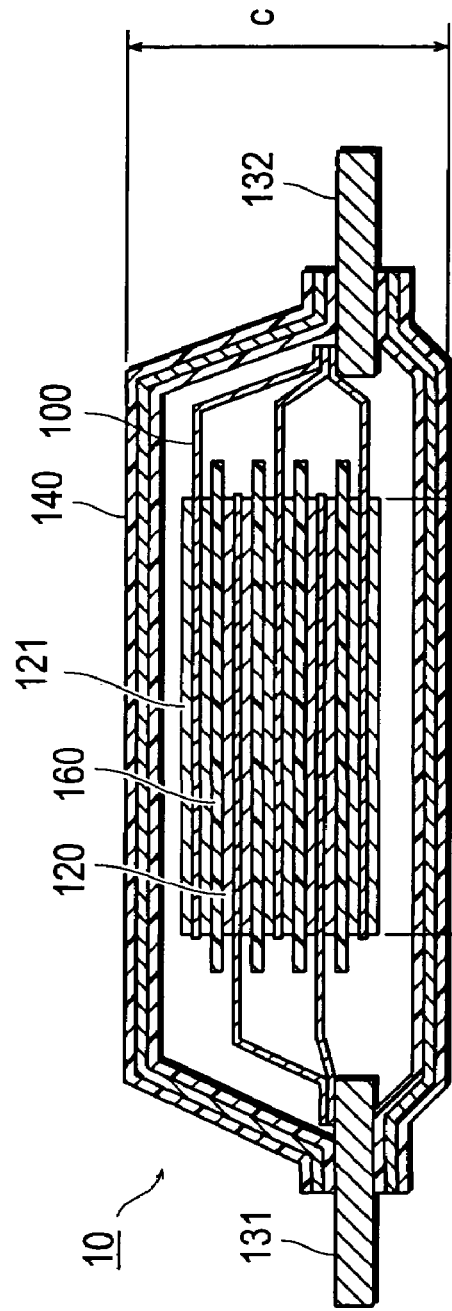
FIG. 1A is a schematic cross-sectional view of a laminated cell structure.
Figure 1B:
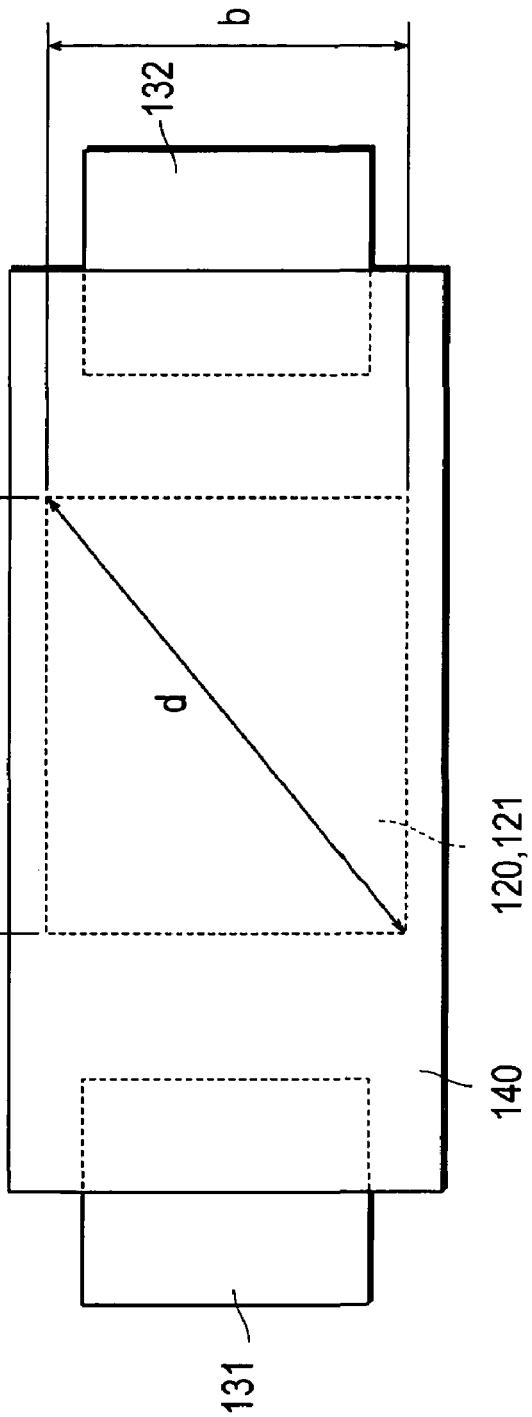
FIG. 1B is a schematic plan view of the structure of FIG. 1A.

FIG. 1A shows a schematic cross-sectional view of a laminated cell structure 10 and FIG. 1B shows a schematic plan view thereof, but the present invention is not limited to FIG. 1A and FIG. 1B. In FIG. 1A, an electrolyte layer 160 is sandwiched between a current collector 100 having positive pole active material layers 120 on both sides thereof and another current collector 100 having negative pole active material layers 121 on both sides thereof, to form a single cell. The electrolyte layer 160 is a separator holding an electrolyte. The current collector 100 having positive pole active material layers 120 on both sides thereof is connected to a positive pole tab 131, while the current collector 100 having negative pole active material layers 121 on both sides thereof is connected to a negative pole tab 132. Parts of the positive pole tab 131 and the negative pole tab 132 and a body laminated with single cells are sealed by a casing 140. The long-side length a and the short-side length b of an electrode indicate long-side length and short-side length, respectively, of a portion where the positive pole active material layer 120 or the negative pole active material layer 121 is in contact with the current collector 100.

The electrode area S is calculated by S=a×b. The cell structure thickness c indicates thickness of a cell structure including a casing.

For example, in case of a cell structure having the long-side length a of an electrode of 200 mm, the short-side length b of the electrode of 150 mm and the cell structure thickness c of 3 mm, the following relations stand:

$$\frac{S}{c \times 1000} = \frac{200 \times 150}{3 \times 1000} = 10$$

$$\frac{b \times 1000}{S} = \frac{150 \times 1000}{200 \times 150} = 5$$

10>5, and thus above inequality (1) is satisfied.

By constituting a cell structure so as to satisfy the above inequality (1), such a cell structure can be obtained that has heat dissipation and rigidity at the same time and hardly resonates even when subjected to vibration. The present invention is particularly effective for a cell structure having laminated structure such as a lithium-ion cell as described above, but more preferably applicable to a bipolar cell structure among lithium-ion cells.

A bipolar cell structure becomes too thick due to lamination of bipolar electrodes in series, and therefore tends to confine heat in the center portion of laminated layers and becomes susceptible to vibration. Therefore, a cell structure of the present invention is more preferably applied to a bipolar cell structure formed by lamination of not less than 2 bipolar electrodes.

Figures 2A, 2B:
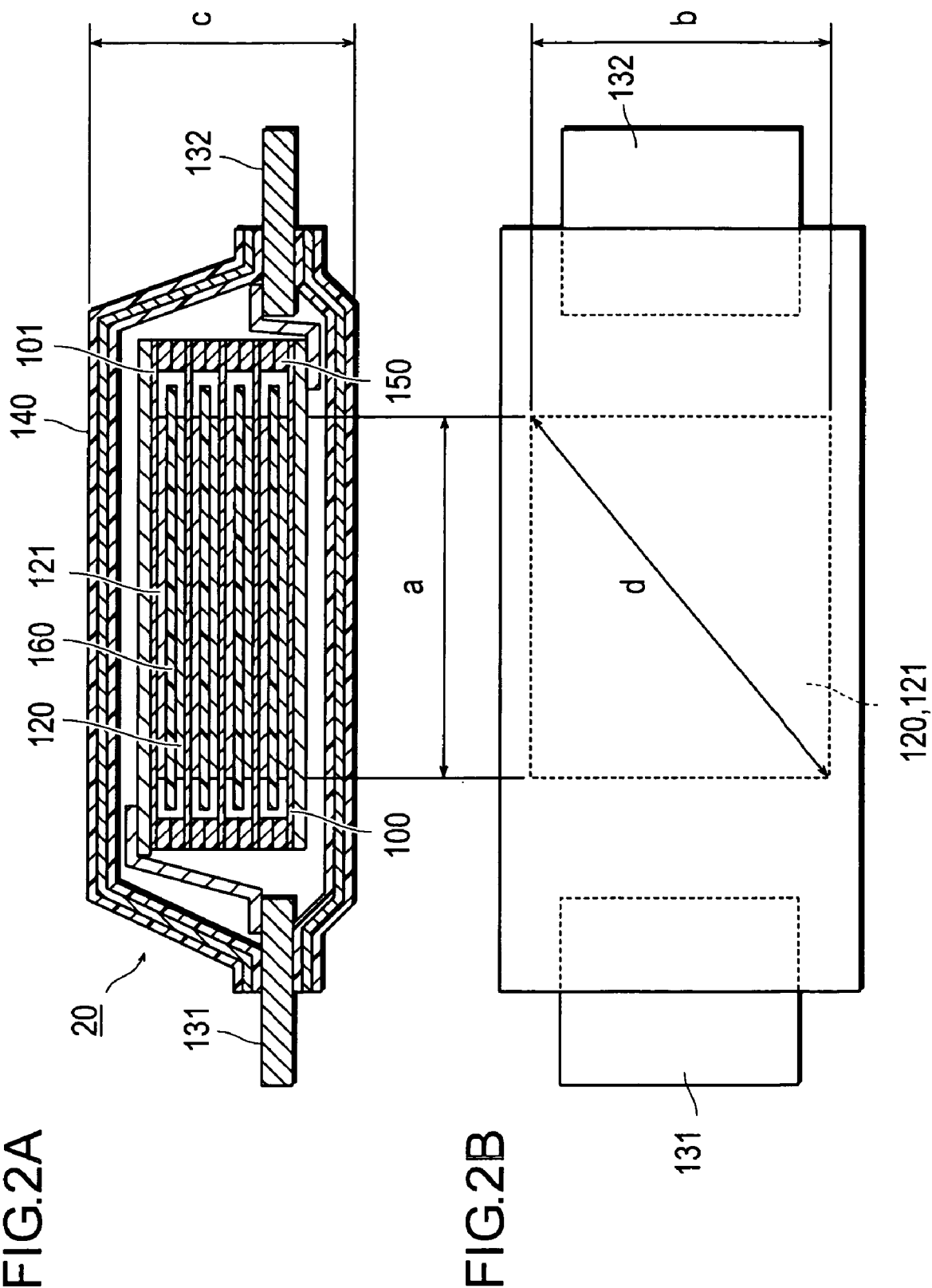
FIG. 2A is a schematic cross-sectional view of a bipolar cell structure.
FIG. 2B is a schematic plan view of the structure of FIG. 2A.

FIG. 2A shows a schematic cross-sectional view of a bipolar cell structure and FIG. 2B shows a schematic plan view thereof, but the present invention is not limited to FIG. 2A and FIG. 2B. In FIG. 2A, the positive pole active material layer 120, the current collector 100 and the negative pole active material layer 121 are laminated in this order to form a bipolar electrode. The bipolar electrode is sandwiched by the electrolyte layers 160 to form a single cell. A seal 150 is sandwiched by current collectors 100. However, a seal 150 may not be used sometimes depending on an electrolyte contained in the electrolyte layer 160. Details will be described later in the item on a seal. The electrolyte layer 160 is a separator holding an electrolyte. The end current collectors 101 are placed at the both ends of a laminated body composed of a bipolar electrode and an electrolyte layer, and connected to a positive pole tab 131 or a negative pole tab 132. Parts of the positive pole tab 131 and the negative pole tab 132 and the end current collectors 101, sandwiching the laminated body, are sealed by the casing 140. In case of a bipolar cell structure, the long-side length a and the short-side length b of an electrode indicate long-side length and short-side length, respectively, of a portion where the positive pole active material layer 120 or the negative pole active material layer 121 is in contact with the electrolyte layer 160.

The outer periphery length L of an electrode is calculated using L=2a+2b. The outer periphery length L of an electrode is preferably not less than 130 times, more preferably 130 to 300 times and particularly preferably 150 to 300 times the thickness c of the cell structure. The outer periphery length L of an electrode is preferably not less than 130 times the thickness c of the cell structure because sufficient heat dissipation is obtained, while the length L is preferably not more than 300 times the thickness c of the cell structure because vibration-proofing nature and rigidity can be maintained.

It is preferable that the outer periphery length L of an electrode is in the range of 750 to 1450 mm and the cell structure thickness c is in the range of 0.1 to 10 mm. The outer periphery length L of an electrode of not more than 1450 mm and the cell structure thickness c of not less than 0.1 mm are preferable from the standpoint of rigidity and easy handling, while the outer periphery length L of an electrode of not less than 750 mm and the cell structure thickness c of not more than 10 mm are preferable from the standpoint of heat dissipation. The cell having sufficient stiffness by using the separator having increased adhesiveness in thickness direction and high stiffness in thickness direction, even if the thickness is not more than 0.1 mm.

It is very preferable to constitute a cell structure so as to satisfy both conditions that "L is not less than 130 times of c" and "L is 750 to 1450 mm and c is 0.1 to 10 mm", but sufficient effect can be obtained even when either condition is satisfied.

The cell structure thickness c of the present invention is preferably in the range of 0.1 to 8 mm from the standpoint of easy handling and heat dissipation.

It is preferable that diagonal line length of an electrode is 260 to 550 mm and the smaller angle formed by the above diagonal lines of an electrode is 60 to 90°.

A diagonal line of 260 to 550 mm and a smaller angle formed by diagonal lines of not more than 90° are preferable because of easy handling, and a diagonal line of 260 to 550 mm and a smaller angle formed by diagonal lines of not less than 60° are preferable because of superior heat dissipation.

Casing

A casing material to be used for a cell structure of the present invention is not especially limited, and includes preferably a polymer material such as polyester, nylon, polypropylene and polycarbonate, a metallic substance such as aluminum, stainless steel and titanium, or a polymer-metal composite material, and more preferably the polymer-metal composite material. The polymer-metal composite material is more preferable from the standpoint of protection of a cell structure and heat dissipation because film thickness can be reduced while keeping strength as a casing material.

With respect to the polymer-metal composite material, a polymer-metal composite film formed by lamination of a heat sealable resin film, a metal foil and a rigid resin film in this order is preferably used. As a heat sealable resin film, for example, polyethylene, an ethylene vinyl acetate copolymer and an ionomer resin can be used. As a metal foil, foil of aluminum, nickel, stainless steel and copper or an alloy of these metals can be used. As a rigid resin film, for example, polyethylene terephthalate and nylon can be used.

Separator

A separator to be used for a cell structure of the present invention has preferably a Shore A hardness of 20 to 110. A Shore A hardness of not lower than 20 is preferable because the resonance frequency hardly shifts to a low frequency side, resulting in low possibility of reaching the resonance frequency when subjected to vibration, while a Shore A hardness of not higher than 110 is preferable because vibration is moderately absorbed, resulting in high vibration-proofing effect. A measurement method for Shore A hardness is based on a method specified in JIS-K-6253.

Figure 3:
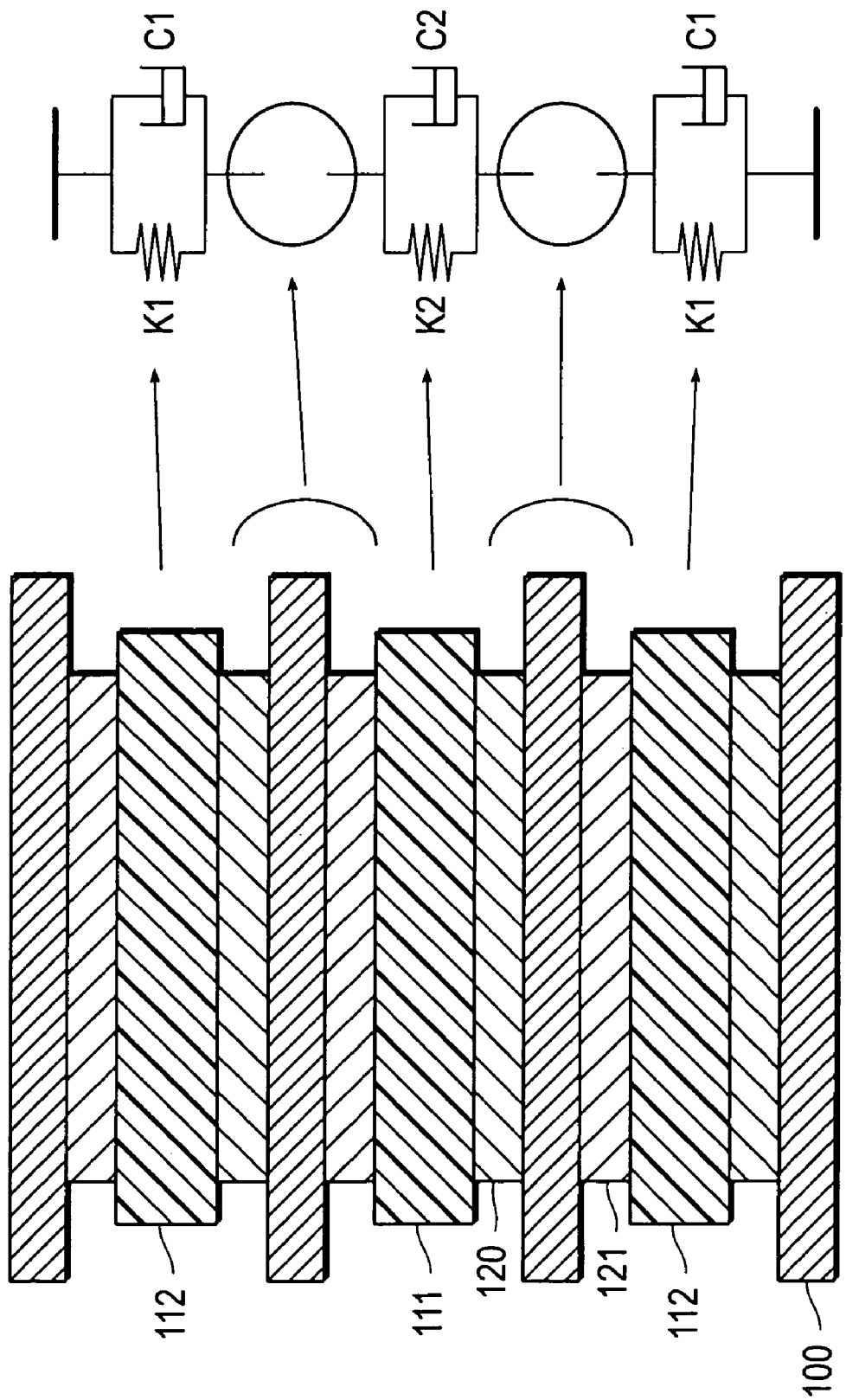
FIG. 3 shows a Voigt model of a bipolar cell structure.
Figure 4A:
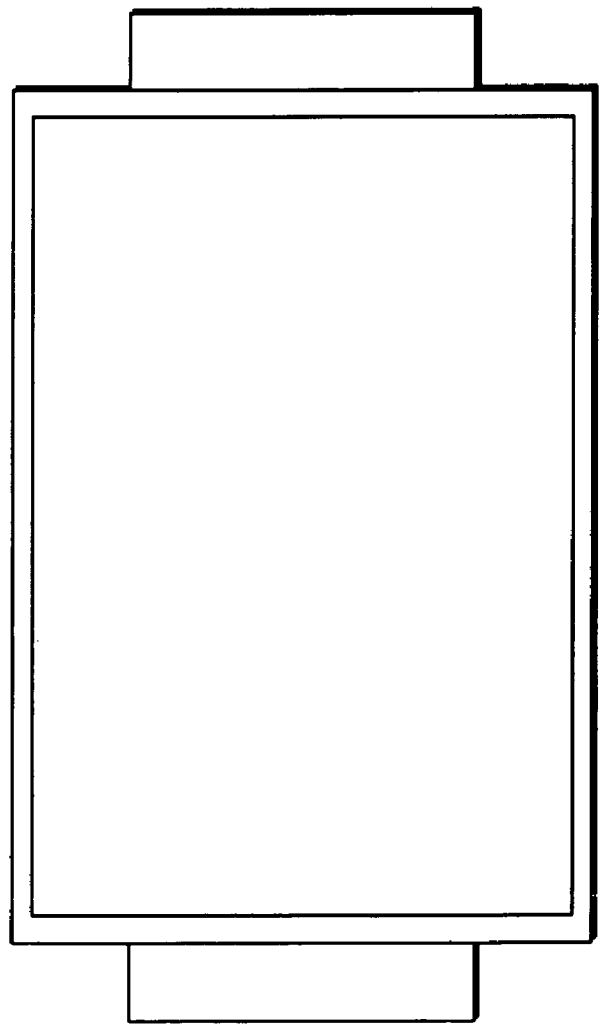
FIG. 4A is a schematic plan view of a cell appearance.
Figure 4B:
FIG. 4B is a front elevation view of the schematic plan view of FIG. 4A.
Figure 4C:
FIG. 4C is a side elevation view of the schematic plan view of FIG. 4A.

It is preferable that a cell structure of the present invention comprises the above separators with different hardness, and the above separator with the same or lower hardness is placed toward the center of a cell structure. Presence of at least 2 kinds of hardness is enough. For example, a Voigt model is shown in FIG. 3. In FIG. 3, when hardness of a separator 111 is lower than that of a separator 112, K1>K2 for spring constants and C2>C1 for damping factors are obtained. Therefore, when a cell structure is subjected to vibration, resonance frequency can be shifted to a higher frequency side with peak height lowered, resulting in further improvement of vibration-proofing performance.

Many substances to be used as a separator of a cell structure that have low Shore A hardness tend to have a high heat-transfer coefficient. Since a substance having a higher heat-transfer coefficient has better heat dissipation, the above separator with lower hardness that is placed toward the center of a cell, can provide a heat dissipation effect in the center of a cell where heat tends to be confined, and thus lowers the maximum temperature reached and improves heat dissipation.

A resin that constitutes a separator is not especially limited, and preferably includes at least one resin selected from a group consisting of a polyester-based resin, an aramid-based resin, a polypropylene-based resin, an inorganic material containing polyester-based resin, an inorganic material containing aramid-based resin and an inorganic material containing polypropylene-based resin. The inorganic material means finely divided powder and filler body, and the stiffness of the separator can be increased by mixing the inorganic material into the above-mentioned resin.

When these resins are used, a separator having a fine porous structure can be formed and they bring large vibration-proofing effect, so it is preferable. Further, the above-mentioned resin is superior in water proofness, humidity proofness, cold cycling property, heat stability and insulation property. Furthermore, among the above-mentioned resins, when the aramid-based resin is used, it is preferable, because a thickness can be thin.

The inorganic material contained in the above-mentioned inorganic material containing polyester-based resin, inorganic material containing aramid-based resin and inorganic material containing polypropylene-based resin is finely divided powder filler body, etc. such as $SiO_2$, the stiffness of the separator can be increased by mixing the inorganic material into the resin.

Furthermore, the fine pores are apt to be formed by filling such inorganic material, and pore diameter per unit area increases, and further the separator having a high gas permeability and high passage curvature. The content of the inorganic material in the separator is preferably 35 to 95% by weight, more preferably 50 to 90% by weight.

Further, the passage curvature (y) is preferably 0.5 to 2.0. Although it is preferable to decrease the passage curvature in order to increase the power, if it is too low, spring constant and damping of the separator decreases and vibration-proofing effect decreases. Therefore, if the passage curvature is not more than 0.5, it becomes hard to exhibit the vibration-proofing effect. Further, if it is too high (e.g. not less than 2), it becomes to increase the power, so it becomes unpreferable for ultra high power. The passage curvature is defined as a value of an absorption surface area S1 of the separator obtained by a general absorption method which is divided by a projected surface S0 ($\gamma=S1/S0$).

These resins are preferably used because they provide a separator with porous structure to give further vibration-proofing effect. Further, the above resins are superior in water-proofing nature, moisture-proofing nature, thermal shock resistance, thermal stability, insulating nature and the like. Among the above resins, an aramid-based resin is preferably used because it enables to make a separator thinner.

A separator is preferably as thin as possible in the range that cell structure strength is not impaired and more preferably not thicker than 20 µm. A thinner separator is preferable because it can provide more layers of single cells within the range represented by the above inequality (1).

An electrolyte held in a separator will be described later in the item on an electrolyte layer.

Positive Pole Active Material Layer

Average particle diameter of a positive pole active material is preferably as small as possible, more preferably not larger than 2 µm. A positive pole active material with larger average particle diameter may give breaking through a separator, leading to a micro short circuit. When a separator is not thicker than 20 µm, average particle diameter of a positive pole active material is preferably not more than one tenth of the thickness of a separator, that is, not larger than 2 µm, which gives uniform surface of a positive pole active material layer.

Particle diameter distribution of a positive pole active material is also preferably as low as possible from the standpoint point of the above problem of micro short circuit, and the like. When an auxiliary material is used in addition to a positive pole active material, average particle diameter thereof is preferably as small as possible and particle diameter distribution thereof is also preferably as low as possible.

A positive pole active material layer contains a positive pole active material and the latter is not especially limited, and it is preferable that a Li—Mn based complex oxide and/or a Li—Ni based complex oxide is contained. An exemplary Li—Mn based complex oxide includes $LiMnO_2$ and a spinel, $LiMn_2O_4$, and an exemplary Li—Ni based complex oxide includes $LiNiO_2$. By using the above complex oxide as a positive pole active material, a horizontal and parallel portion to a charge-discharge time axis in a charge-discharge curve obtained from a graph of voltage vs. charge-discharge time can be tilted, and thus the state of charge (SOC) of a cell structure can be exactly estimated by measuring voltage. Overcharge and overdischarge can thus be detected to be settled. Further it can be said that use of the above complex oxide as a positive pole active material makes response milder even when a cell structure is failured by overcharge or overdischarge and thus provides high reliability at abnormal situation.

A positive pole active material that can be used includes a compound of a transition metal and lithium such as a lithium-cobalt based complex oxide such as $LiCoO_2$, a lithium-iron based complex oxide such as $LiFeO_2$, a phosphate compound of a transition metal and lithium such as $LiFePO_4$, and a sulfate compound of a transition metal and lithium; a transition metal oxide such as $V_2O_5$, $MnO_2$ and $MoO_3$; a transition metal sulfide such as $TiS_2$ and $MOS_2$; $PbO_2$; AgO or NiOOH. These compounds may be used alone or in combination thereof.

A positive pole active material layer can contain an auxiliary material such as an electrolyte, a salt of an electrolyte and an auxiliary material for conductivity enhancement besides a positive pole active material. The electrolyte and the salt of the electrolyte will be described later in detail in the item on an electrolyte layer. An auxiliary material for conductivity enhancement includes, for example, acetylene black, carbon black or graphite.

Negative Pole Active Material Layer

Average particle diameter of a negative pole active material is preferably as small as possible, more preferably not larger than 2 µm, by the same reason for a positive pole active material. Particle diameter distribution of a negative pole active material is also preferably as low as possible. When an auxiliary material is used in addition to a negative pole active material, average particle diameter thereof is preferably as small as possible and particle diameter distribution thereof is also preferably as low as possible.

A negative pole active material layer contains a negative pole active material and the latter is not especially limited, however, it is preferable that a crystalline carbon material and/or an amorphous carbon material are contained. An exemplary crystalline carbon material includes graphite and an exemplary amorphous carbon material includes hard carbon. By using the above complex oxide as a negative pole active material, a horizontal and parallel portion to a charge-discharge time axis in a charge-discharge curve obtained from a graph of voltage vs. charge-discharge time can be tilted, and thus the state of charge (SOC) of a cell structure can be exactly estimated by measuring voltage. Overcharge and overdischarge can thus be detected to be settled. Further it can be said that use of the above complex oxide as a negative pole active material makes response milder even when a cell structure is failured by overcharge or overdischarge and thus provides high reliability at abnormal situation. These effects are especially remarkable when an amorphous carbon material is used.

A negative pole active material that can be used includes a metal oxide such as TiO, $Ti_2O_3$ and $TiO_2$; and a complex oxide of a transition metal and lithium such as $Li_{4/3}Ti_{5/3}O_4$. These compounds may be used alone or in combination thereof.

A negative pole active material layer can contain an auxiliary material such as an electrolyte, a salt of an electrolyte and an auxiliary material for conductivity enhancement besides a negative pole active material. The electrolyte and the salt of the electrolyte will be described later in detail in the item on an electrolyte layer. The auxiliary material for conductivity enhancement includes, for example, acetylene black, carbon black or graphite.

Electrolyte Layer

An electrolyte forming an electrolyte layer includes a solid polymer electrolyte or a gel electrolyte. The solid polymer electrolyte includes, for example, polyethylene oxide, polypropylene oxide and a copolymer of these oxides.

The gel electrolyte contains an electrolytic solution in a skeleton composed of polymer electrolytes. As the skeleton, a solid polymer electrolyte having ionic conductivity or a polymer not having ionic conductivity can be used.

The electrolyte solution is composed of a salt of an electrolyte and a plasticizer. The salt of an electrolyte includes, for example, an inorganic anion salt such as $LiPF_6$, $LiBF_4$, $LiClO_4$, $LiAsF_6$, $LiTaF_6$, $LiAlCl_4$ and $Li_2B_{10}Cl_{10}$; and an organic anion salt such as $Li(CF_3SO_2)_2N$ and $Li(C_2F_5SO_2)_2N$. These salts may be mixed alone or in combination of two or more thereof with a plasticizer. The plasticizer includes, for example, cyclic carbonates such as propylene carbonate and ethylene carbonate; chain-like carbonates such as dimethyl carbonate, methylethyl carbonate and diethyl carbonate; ethers such as tetrahydrofuran, 2-methyltetrahydrofuran, 1,4-dioxane, 1,2-dimethoxyethane and 1,2-dibutoxyethane; lactones such as γ-butylolactone; nitriles such as acetonitrile; esters such as methyl propionate; amides such as dimethylformamide; and esters such as methyl acetate and methyl formate. These plasticizers may be mixed alone or in combination of two or more thereof with the salt of an electrolyte.

The solid polymer electrolyte having ionic conductivity to be used for a gel electrolyte includes, for example, polyethylene oxide, polypropylene oxide and a copolymer of these oxides. The polymer not having ionic conductivity to be used for the gel electrolyte includes, for example, polyvinylidene fluoride, polyvinyl chloride, polyacrylonitrile and polymethyl methacrylate.

Weight ratio of the solid polymer electrolyte and an electrolyte solution in the gel electrolyte is preferably 20:80 to 98:2.

A separator holds the above electrolyte to form the electrolyte layer.

Current Collector

A current collector is composed of a metal foil produced by a rolling method, and the like or a thin film of other than a metal foil produced by a spray coating method, and the like.

The type of a metal foil is not especially limited, and includes, for example, a foil of a clad material produced by plastering of nickel and aluminum, a nickel foil, a nickel-base alloy foil, an aluminum foil and a stainless steel foil. The aluminum foil is preferably used in view of cost, while the stainless steel foil is preferably used in view of strength.

Another type of a thin film other than the metal foil is not especially limited, and includes, for example, a mixture of a powder of aluminum, steel, titanium, nickel, stainless steel or an alloy thereof and a binder. These metal powders may be used alone or as a mixture of 2 or more kinds. The binder includes an epoxy resin, and the like.

Thickness of the current collector is preferably 5 to 20 µm, more preferably 8 to 15 µm, and still more preferably 10 to 15 µm. Thickness of the current collector is preferably not less than 5 µm and particularly preferably not less than 10 µm from the standpoint of rigidity. Thickness of the current collector is preferably not more than 20 µm from the standpoint of heat dissipation of a cell.

Seal

A bipolar cell of the present invention can be equipped with a seal between current collectors themselves. The seal is located so as to surround a positive pole active material layer, an electrolyte layer and a negative pole active material layer and thus can prevent an electrolyte solution from leaking when a gel electrolyte is used as an electrolyte layer.

As disclosed in US 2004/0091771 A1, the seal has preferably such structure that a second resin having higher melting point than a first resin and not having conductivity is sandwiched between the first heat sealable resins and placed in parallel to the current collector. A preferable combination of the first resin and the second resin from the standpoint of a production method is such a combination of the first resin with melting point lower than 180° C. and the second resin with melting point not lower than 180° C. which is heat sealable with the first resin. These resins are not especially limited, and include, for example, polypropylene, polyethylene, polyurethane or thermoplastic olefin rubber as the first resin and a polyamide-based resin such as nylon 6, nylon 66, polytetrafluoroethylene, polyvinylidene fluoride and polystyrene, or silicone rubber as the second resin.

Because there has not been any study on the relation among short-side length of an electrode in a cell structure, electrode area and cell structure thickness, the size limit of an electrode of a conventional cell structure has been about the A6 size. Therefore, a cell of high power and high capacity has not yet appeared. However, the present invention has enabled a product of a cell structure equipped with an electrode of about the A5 to A2 size that has never been attained so far and thus realized a cell with high power and high capacity.

The second aspect of the present invention is a combined cell formed by connecting not less than 2 of the above cell structures in series and/or parallel. FIGS. 5A, 5B and 5C show schematic views of appearance of a combined-cell module 31 which is prepared by putting a cell structure (10 or 20) shown by FIGS. 4A, 4B and 4C into a casing 170. FIGS. 6A, 6B and 6C show schematic views of appearance of a combined cell 30 fabricated by connecting 6 combined-cell modules in parallel. In FIGS. 6A, 6B and 6C, each combined-cell module 31 is united to one piece using connecting plates 180 and fixing screws 190, and elastic materials 200 are placed between each combined-cell module 31 to form a vibration-proofing structure. A tab 133 of each combined-cell module 31 is connected by a busbar 210. FIGS. 4A, 4B and 4C, FIGS. 5A, 5B and 5C and FIGS. 6A, 6B and 6C show one example of a cell structure, a combined-cell module and a combined cell, respectively but the present invention is not limited thereto.

Figure 7:
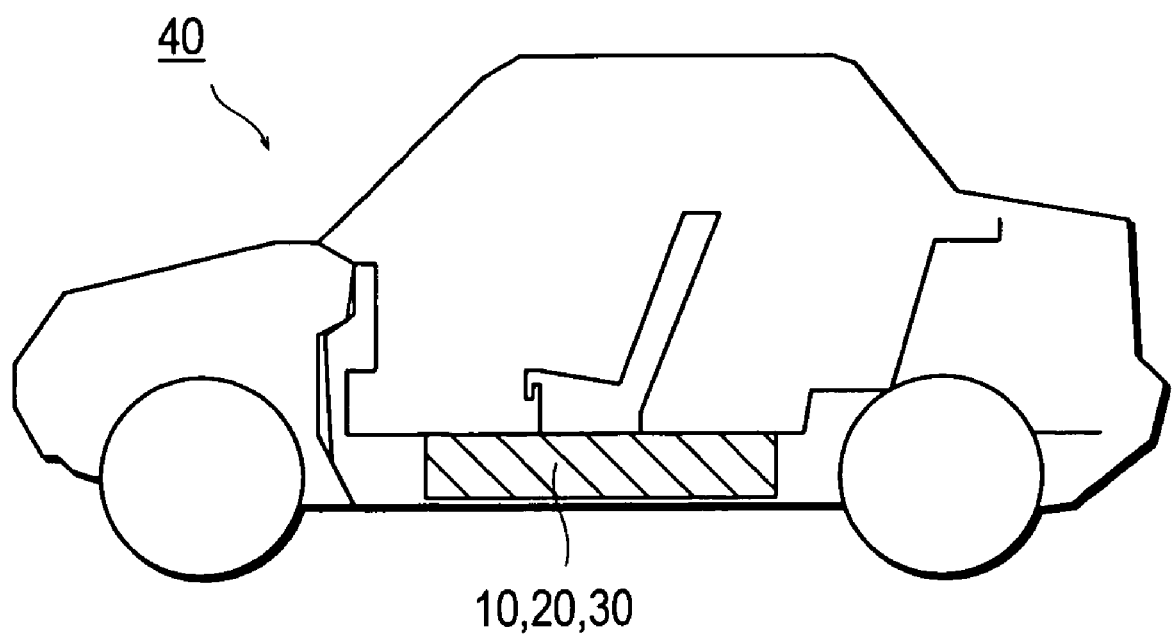
FIG. 7 is a schematic cross-sectional view of a vehicle equipped with a cell or a combined cell.

The third aspect of the present invention is a vehicle equipped with the above cell structure or the above combined cell. A cell structure of the present invention or a combined cell composed of cell structures of the present invention are superior in reliability and power generation characteristic, and therefore can be preferably used as a mobile power source for vehicles. Since a cell structure (10 or 20) or a combined cell (30) of the present invention is a space-saving type, it can be placed under the floor of a vehicle 40 as shown by FIG. 7, behind the seat-back or under the seat.

The present invention will be specifically described by Examples hereinafter, but the present invention should not be limited to these Examples.

EXAMPLES 2, 4 TO 31 AND COMPARATIVE EXAMPLES 4 TO 10

At first, a method for production of a bipolar cell structure of Example 4 is shown. A stainless steel foil with thickness of 15 μm used as a current collector was coated on one side with LiMnO2 (average particle diameter: 2 μm), a Li—Mn based complex oxide, as a positive pole active material, to a thickness of 10 μm to form a positive pole active material layer. The stainless steel foil was then coated on the other side with hard carbon (average particle diameter: 6 μm), an amorphous carbon material, as a negative pole active material, to a thickness of 15 μm to form a negative pole active material layer.

Poly(vinyliden fluoride) (PVdF), a precursor of a crosslinkable gel electrolyte was impregnated into a polyester nonwoven fabric separator (thickness: 20 μm, Shore A hardness: 61) to form an electrolyte layer. An end current collector was prepared by using the above stainless steel foil to form the above positive pole active material layer on one side and the above negative pole active material layer on the other side. An electrode was produced so as to be the A4 size.

Single cell layers were laminated, and a tab (thickness: 100 μm, width: 100 mm) made of aluminum and a tab (thickness: 100 μm, width: 100 mm) made of copper were vibration welded to a positive pole end and a negative pole end of the above laminated body, respectively, which were then subjected to sealing with a laminate material having triple layer structure composed of a maleic acid-modified polypropylene film as a heat sealable resin film, a stainless steel foil as a metal foil and a nylon-aluminum-modified polypropylene as a rigid resin film. The cell structure was then subjected to thermal crosslinking at about 80° C. for about 2 hours to produce a bipolar cell structure of Example 4. The long-side length a of an electrode, the short-side length b of an electrode, the cell structure thickness c, the outer periphery length L of an electrode, the electrode area S and the diagonal length T of an electrode are shown in Table 1.

Bipolar cell structures of Examples 2, 5 to 31 and Comparative Examples 1 to 10 were manufactured similarly as in Example 4. The specifications of each Example and each Comparative Example are shown in Table 1 and Table 2, wherein "Li—Ni base" for the positive pole active material indicates use of LiNiO$_2$, "crystalline" for the negative pole active material indicates use of graphite, "aramid", "polypropylene" and "PET" for a separator material indicate use of aramid nonwoven fabric, polypropylene nonwoven fabric and polyethylene terephthalate nonwoven fabric, respectively, the "inorganic material containing" means the resin wherein finely divided SiO$_2$ powder is incorporated with the resin as the inorganic material, when finely divided SiO$_2$ powder is used as the inorganic material, the finely divided SiO$_2$ powder is incorporated in the separator in an amount of 80% by weight and "resin" for a casing material indicates use of PP (polypropylene).

EXAMPLES 1 AND 3, AND COMPARATIVE EXAMPLES 1 TO 3

At first, a method for production of a laminated cell structure of Example 3 is shown. An aluminum foil with thickness of 15 μm as a current collector was coated on both sides with LiMnO$_2$ (average particle diameter: 2 μm), a Li—Mn based complex oxide, as a positive pole active material, to a thickness of 10 μm to form a positive pole active material layer. A copper foil with thickness of 15 μm as a current collector was coated on both sides with hard carbon (average particle diameter: 6 μm), a crystalline carbon material, as a negative pole active material, ton a thickness of 15 μm to form a negative pole active material layer.

A precursor of a crosslinkable gel electrolyte was impregnated into a polyester nonwoven fabric separator (thickness: 20 μm, Shore A hardness: 61) to form an electrolyte layer. An electrode was produced to be the A4 size.

Single cell layers were laminated and a tab (thickness: 100 μm, width: 100 mm) made of aluminum and a tab (thickness: 100 μm, width: 100 mm) made of copper were vibration welded to a positive pole and a negative pole, respectively, which were then subjected to sealing with a laminate material having triple layer structure composed of a maleic acid-modified polypropylene film as a heat sealable resin film, a stainless steel foil as a metal foil and nylon-aluminum-modified polypropylene as a rigid resin film. The cell structure was then subjected to thermal crosslinking at about 80° C. for about 2 hours to produce a laminated cell structure of Example 3. The long-side length a of an electrode, the short-side length b of an electrode, the cell structure thickness c, the outer periphery length L of an electrode, the electrode area S and the diagonal length T of an electrode are shown in Table 1.

Laminated cell structures of Example 1 and Comparative Examples 1 to 3 were produced similarly as in Example 3. The specifications of each Example and each Comparative Example are shown in Table 1 and Table 2. In Table 2, "amorphous" for a negative pole active material indicates use of hard carbon and "metal can" for a casing material indicates use of aluminum.

EXAMPLE 32

An acceleration pickup was installed at the center of a single cell element obtained by a method of Examples 1 to 31 and Comparative Examples 1 to 10, and a vibration spectrum of the acceleration pickup when hammered with an impulse hammer was measured. The method for setting was in accordance with JIS-B-0908 (Methods for calibration of vibration and shock pick-ups: Basic concept). Thus measured spectrum was analyzed using an FFT analyzer and converted to the dimensions of frequency and acceleration. Thus obtained frequency was averaged and smoothed to obtain a vibration transmissibility spectrum. These acceleration spectra in the range of 10 to 300 Hz were averaged to obtain an average vibration value.

A vibration damping factor was obtained as ratio of the average vibration value in each Example to each standard value. In more detail, the vibration damping factor was obtained as ratio of the average vibration value of an Example×100/the average vibration value in a Comparative Example. The vibration damping factor of 0% indicates that the average vibration value in an Example was the same as that of a Comparative Example and no damping of vibration occurred. The vibration damping factor of 30% indicates that the average vibration value in an Example was reduced to 30% compared with that in a Comparative Example. A Comparative Example having the same electrode area as that in an Example was employed as each comparison standard. Specifically, the comparison standard in Examples 1 and 2 is Comparative Example 4; the comparison standard in Examples 3 to 6 and 13 is Comparative Example 5; the comparison standard in Examples 7 to 9 is Comparative Example 6; and the comparison standard in Examples 10 to 12 is Comparative Example 7, the comparison standard in Example 14 and Comparative Examples 8-9 is Comparative Example 1, the comparison standard in Examples 15-16 and Comparative Example 10 is Comparative Example 2, the comparison standard in Examples 17-19 is Comparative Example 3, the comparison standard in Examples 20-22 is Comparative Example 4, the comparison standard in Examples 23-25 is Comparative Example 5, the comparison standard in Examples 26-28 is Comparative Example 6, and comparison standard in Examples 29-31 is Comparison Example 7.

The vibration damping factor in each Example and the peak value of primary resonance (the maximum peak frequency appearing in the lowest frequency side) in each Example and each Comparative Example are shown in Table 1. It can be seen from the vibration damping factors shown in Table 1 that the average vibration value is reduced in each Example.

Figure 8:
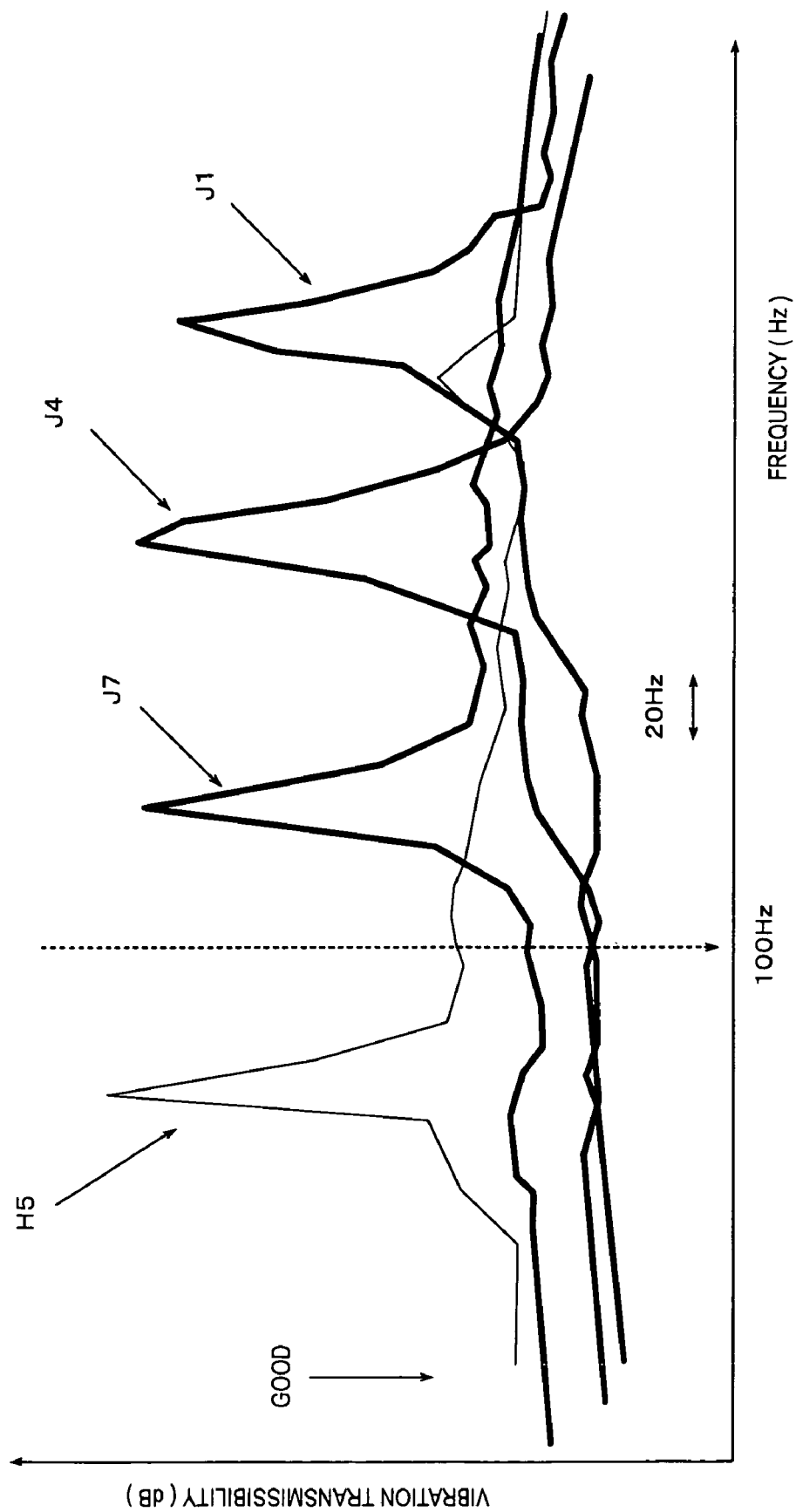
FIG. 8 shows primary resonance peaks in Examples and Comparative Examples.

The vibration transmissibility and the frequency in Examples 1, 4 and 7 and Comparative Example 5 are shown in FIG. 8. J1, J4, J7 and H5 in FIG. 8 indicate Example 1, Example 4, Example 7 and Comparative Example 5, respectively. It can be seen in FIG. 8 that the primary resonance peak appears in the region not higher than 100 Hz for a single cell layer of Comparative Example 5. Since vibration generating on a typical vehicle has a frequency of not higher than about 100 Hz, a cell having a primary resonant frequency in the above frequency range will resonate. On the other hand, it can be seen that the primary resonance peaks in Examples 1, 4 and 7 appear in the higher frequency region than 100 Hz and thus these cells will not resonate on a vehicle. It can further be seen in Table 1 that the primary resonance peaks in the Examples, that are not shown in FIG. 8, appear also in higher frequency region than 100 Hz. It can be understood from the above that a cell of the present invention is superior in vibration-proofing performance.

EXAMPLE 33

The cell structures obtained in the methods of Examples 1 to 31 and Comparative Examples 1 to 10 were subjected to a 10C cycle test for 60 minutes. The maximum temperature reached among average temperatures in the center portion of a cell structure was measured during the test to obtain the difference from temperature before the test, which was referred to as "temperature rise". After 60 minutes, the current was cut off and the cell structure was left for standing at room temperature. Time required for the cell structure to return to room temperature was measured and referred to as "heat dissipation time". Temperature of a laminated structure cell was measured using a thermocouple attached to the edge of the foil located at the center of the cell. The 10C cycle test for 60 minutes means a test where 6 minute charge and 6 minute discharge are repeated alternately 5 times at a current value of 10C.

Figure 9:
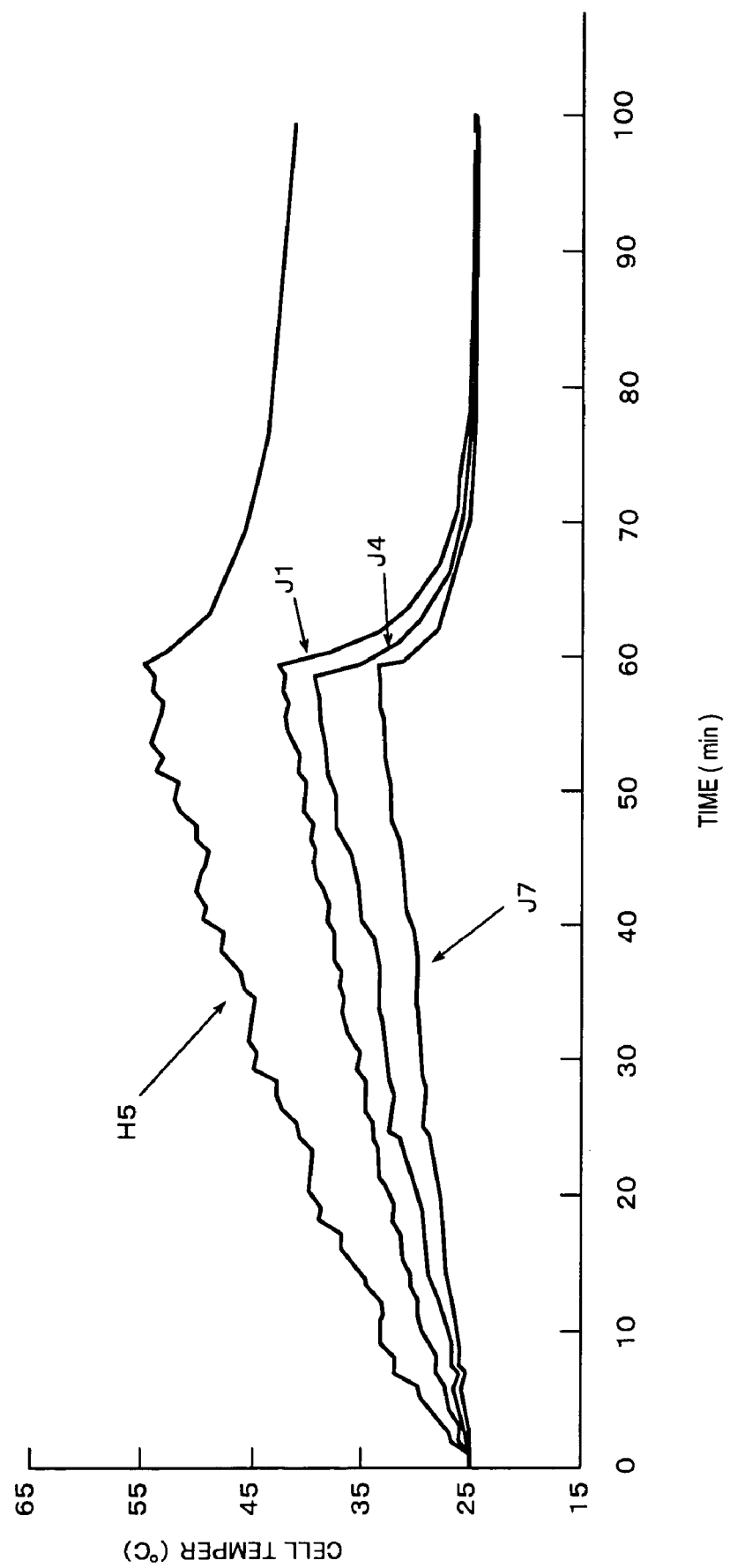
FIG. 9 shows heat dissipation performance in Examples and Comparative Examples.

"Temperature rise" and "heat dissipation time" in each Example and each Comparative Example are shown in Table 1. "Heat dissipation time" was measured for up to 60 minutes. When a cell did not return to room temperature in 60 minutes, "60≦" was entered in the Table. It can be seen from the columns of "temperature rise" that a cell structure of an Example has lower "temperature rise" inside the cell during use compared with that of a Comparative Example. It can further be seen from the columns of "heat dissipation time" in Table 1 that the average temperature in the center portion of a cell structure of an Example returns to room temperature in 20 minutes at longest, while the average temperature in the center portion of a cell structure of a Comparative Example does not return to room temperature even after 60 minutes. Heat dissipation performances in Examples 1, 4 and 7 and Comparative Example 5 are shown in FIG. 9. It can be seen also in FIG. 9 that a cell temperature-time curve in an Example has smaller gradient between 0 and 60 minutes of the 10C cycle test and a larger gradient after 60 minutes compared with that in a Comparative Example and thus a cell structure of an Example has less "temperature rise" in the cell during use compared with that of a Comparative Example.

TABLE 1

| Size of Electrode | Long-side Length: a (mm) | Short-side Length: b (mm) | Thickness: c (mm) | Outer Periphery Length: L (mm) | Area: S ($m^2$) | Diagonal Line Length: T (mm) | $\frac{S}{c \times 1000} = H2$ | $\frac{b \times 1000}{S} = H1$ | L/c |
|---|---|---|---|---|---|---|---|---|---|

Example

| | | | | | | | | | |
|---|---|---|---|---|---|---|---|---|---|
| 1 | A5 | 200 | 150 | 3 | 700 | 0.03 | 250 | 10 | 5 | 233 |
| 2 | A5 | 200 | 150 | 5 | 700 | 0.03 | 250 | 6 | 5.0 | 140 |
| 3 | A4 | 300 | 200 | 3 | 1000 | 0.06 | 361 | 20 | 3.3 | 333 |
| 4 | A4 | 300 | 200 | 5 | 1000 | 0.06 | 361 | 12 | 3.3 | 200 |
| 5 | A4 | 300 | 200 | 7 | 1000 | 0.06 | 361 | 8.6 | 3.3 | 143 |
| 6 | A4 | 300 | 200 | 10 | 1000 | 0.06 | 361 | 6.0 | 3.3 | 100 |
| 7 | A3 | 400 | 300 | 5 | 1400 | 0.12 | 500 | 24 | 2.5 | 280 |
| 8 | A3 | 400 | 300 | 10 | 1400 | 0.12 | 500 | 12 | 2.5 | 140 |
| 9 | A3 | 400 | 300 | 15 | 1400 | 0.12 | 500 | 8 | 2.5 | 93 |
| 10 | A2 | 600 | 400 | 5 | 2000 | 0.24 | 721 | 48 | 1.7 | 400 |
| 11 | A2 | 600 | 400 | 10 | 2000 | 0.24 | 721 | 24 | 1.7 | 200 |
| 12 | A2 | 600 | 400 | 15 | 2000 | 0.24 | 721 | 16 | 1.7 | 133 |
| 13 | A4 | 300 | 200 | 5 | 1000 | 0.06 | 361 | 12 | 3.3 | 200 |
| 14 | A8 | 75 | 50 | 0.1 | 250 | 0.00375 | 90 | 37.5 | 13.3 | 2500 |
| 15 | A7 | 100 | 75 | 0.5 | 350 | 0.0075 | 125 | 15.0 | 10.0 | 700 |
| 16 | A7 | 100 | 75 | 0.1 | 350 | 0.0075 | 125 | 75.0 | 10.0 | 3500 |
| 17 | A6 | 150 | 100 | 1 | 500 | 0.015 | 180 | 15.0 | 6.7 | 500 |
| 18 | A6 | 150 | 100 | 0.5 | 500 | 0.015 | 180 | 30.0 | 6.7 | 1000 |
| 19 | A6 | 150 | 100 | 0.1 | 500 | 0.015 | 180 | 150.0 | 6.7 | 5000 |
| 20 | A5 | 200 | 150 | 1 | 700 | 0.03 | 250 | 30.0 | 5.0 | 700 |
| 21 | A5 | 200 | 150 | 0.5 | 700 | 0.03 | 250 | 60.0 | 5.0 | 1400 |
| 22 | A5 | 200 | 150 | 0.1 | 700 | 0.03 | 250 | 300.0 | 5.0 | 7000 |
| 23 | A4 | 300 | 200 | 1 | 1000 | 0.06 | 361 | 60.0 | 3.3 | 1000 |
| 24 | A4 | 300 | 200 | 0.5 | 1000 | 0.06 | 361 | 120.0 | 3.3 | 2000 |
| 25 | A4 | 300 | 200 | 0.1 | 1000 | 0.06 | 361 | 600.0 | 3.3 | 10000 |
| 26 | A3 | 400 | 300 | 1 | 1400 | 0.12 | 500 | 120.0 | 2.5 | 1400 |
| 27 | A3 | 400 | 300 | 0.5 | 1400 | 0.12 | 500 | 240.0 | 2.5 | 2800 |
| 28 | A3 | 400 | 300 | 0.1 | 1400 | 0.12 | 500 | 1200.0 | 2.5 | 14000 |
| 29 | A2 | 600 | 400 | 1 | 2000 | 0.24 | 721 | 240.0 | 1.7 | 2000 |
| 30 | A2 | 600 | 400 | 0.5 | 2000 | 0.24 | 721 | 480.0 | 1.7 | 4000 |
| 31 | A2 | 600 | 400 | 0.1 | 2000 | 0.24 | 721 | 2400.0 | 1.7 | 20000 |

Comparative Example

| | | | | | | | | | | |
|---|---|---|---|---|---|---|---|---|---|---|
| 1 | A8 | 75 | 50 | 5 | 250 | 0.00375 | 90 | 08 | 13.3 | |
| 2 | A7 | 100 | 75 | 5 | 350 | 0.0075 | 125 | 15 | 10.0 | |
| 3 | A6 | 150 | 100 | 5 | 500 | 0.015 | 180 | 3 | 6.7 | 100 |
| 4 | A5 | 200 | 150 | 7 | 700 | 0.03 | 250 | 4.3 | 5 | 100 |
| 5 | A4 | 300 | 200 | 20 | 1000 | 0.06 | 361 | 3 | 3.3 | 50 |
| 6 | A3 | 400 | 300 | 50 | 1400 | 0.12 | 500 | 2.4 | 2.5 | 28 |
| 7 | A2 | 600 | 400 | 145 | 2000 | 0.24 | 721 | 166 | 1.7 | 14 |
| 8 | A8 | 75 | 50 | 1 | 250 | 0.00375 | 90 | 3.8 | 13.3 | 250 |
| 9 | A8 | 75 | 50 | 0.5 | 250 | 0.00375 | 90 | 7.5 | 13.3 | 500 |
| 10 | A7 | 100 | 75 | 1 | 350 | 0.0075 | 125 | 7.5 | 10.0 | 350 |

| | H2 < H1 | 130 ≦ L/c | 150 ≦ L/c ≦ 2000 | 750 ≦ L ≦ 1450, 0.1 ≦ c ≦ 10 (mm) | 260 ≦ T ≦ 550 (mm) | Temperature Rise (δT) | Heat Dissipation Time (min) | Primary Resonance Peak (Hz) | Vibration Damping Factor (%) |
|---|---|---|---|---|---|---|---|---|---|

Example

| | | | | | | | | | |
|---|---|---|---|---|---|---|---|---|---|
| 1 | ○ | ○ | ○ | x | x | 19 | 18 | 175 | 43 |
| 2 | ○ | ○ | x | x | x | 20 | 20 | 172 | 45 |
| 3 | ○ | ○ | x | ○ | ○ | 13 | 14 | 160 | 48 |
| 4 | ○ | ○ | ○ | ○ | ○ | 15 | 15 | 157 | 52 |
| 5 | ○ | ○ | x | ○ | ○ | 17 | 16 | 155 | 50 |
| 6 | ○ | x | x | ○ | ○ | 18 | 18 | 150 | 42 |
| 7 | ○ | ○ | ○ | ○ | ○ | 9 | 13 | 135 | 52 |
| 8 | ○ | ○ | x | ○ | ○ | 12 | 15 | 133 | 50 |
| 9 | ○ | x | x | ○ | ○ | 15 | 16 | 130 | 40 |
| 10 | ○ | ○ | ○ | x | x | 8 | 11 | 120 | 34 |
| 11 | ○ | ○ | ○ | x | x | 12 | 13 | 115 | 36 |
| 12 | ○ | ○ | x | x | x | 16 | 16 | 107 | 30 |
| 13 | ○ | ○ | ○ | ○ | ○ | 15 | 15 | 150 | 55 |
| 14 | ○ | ○ | x | x | x | 18 | 18 | 160 | 30 |
| 15 | ○ | ○ | ○ | x | x | 15 | 15 | 165 | 35 |
| 16 | ○ | ○ | x | x | x | 10 | 13 | 160 | 33 |
| 17 | ○ | ○ | ○ | x | x | 18 | 18 | 161 | 34 |
| 18 | ○ | ○ | ○ | x | x | 14 | 14 | 163 | 33 |
| 19 | ○ | ○ | x | x | x | 9 | 10 | 165 | 32 |

TABLE 1-continued

| | | | | | | | | | | |
|---|---|---|---|---|---|---|---|---|---|---|
| 20 | ○ | ○ | ○ | x | x | 17 | 17 | 155 | 38 | |
| 21 | ○ | ○ | ○ | x | x | 13 | 14 | 156 | 35 | |
| 22 | ○ | ○ | x | x | x | 9 | 10 | 158 | 33 | |
| 23 | ○ | ○ | ○ | ○ | ○ | 16 | 15 | 143 | 48 | |
| 24 | ○ | ○ | ○ | ○ | ○ | 12 | 13 | 145 | 45 | |
| 25 | ○ | ○ | x | ○ | ○ | 8 | 10 | 150 | 44 | |
| 26 | ○ | ○ | ○ | ○ | ○ | 15 | 14 | 130 | 50 | |
| 27 | ○ | ○ | x | ○ | ○ | 11 | 10 | 133 | 48 | |
| 28 | ○ | ○ | x | ○ | ○ | 8 | 10 | 135 | 46 | |
| 29 | ○ | ○ | ○ | x | x | 14 | 12 | 110 | 42 | |
| 30 | ○ | ○ | x | x | x | 11 | 10 | 113 | 40 | |
| 31 | ○ | ○ | x | x | x | 7 | 10 | 115 | 38 | |
| Comparative Example | | | | | | | | | | |
| 1 | x | x | x | x | x | 27 | ≧60 | 95 | — | |
| 2 | x | x | x | x | ○ | 25 | ≧60 | 88 | — | |
| 3 | x | x | x | x | ○ | 23 | ≧60 | 80 | — | |
| 4 | x | x | x | x | x | 25 | ≧60 | 85 | — | |
| 5 | x | x | x | ○ | x | 30 | ≧60 | 78 | — | |
| 6 | x | x | x | ○ | x | 35 | ≧60 | 75 | — | |
| 7 | x | x | x | ○ | x | 50 | ≧60 | 50 | — | |
| 8 | x | ○ | ○ | x | x | 30 | ≧60 | 180 | 0 | |
| 9 | x | ○ | ○ | x | x | 28 | ≧60 | 175 | 0 | |
| 10 | x | ○ | ○ | x | x | 25 | ≧60 | 170 | 0 | |

TABLE 2

| | Cell Structure | Laminated number of a single cell layer | Positive Pole Material | Particle Diameter (μm) | Thickness (μm) | Negative Pole Material | Particle Diameter (μm) |
|---|---|---|---|---|---|---|---|
| Example | | | | | | | |
| 1 | Laminate | 2 | Li—Mn Base | 2 | 10 | Crystalline | 6 |
| 2 | Bipolar | 2 | Li—Mn Base | 2 | 10 | Crystalline | 6 |
| 3 | Laminate | 2 | Li—Mn Base | 2 | 10 | Amorphous | 6 |
| 4 | Bipolar | 2 | Li—Mn Base | 2 | 10 | Amorphous | 6 |
| 5 | Bipolar | 2 | Li—Mn Base | 2 | 10 | Amorphous | 6 |
| 6 | Bipolar | 2 | Li—Ni Base | 0.8 | 5 | Amorphous | 2 |
| 7 | Bipolar | 2 | Li—Mn Base | 2 | 10 | Amorphous | 6 |
| 8 | Bipolar | 2 | Li—Ni Base | 0.8 | 5 | Amorphous | 2 |
| 9 | Bipolar | 2 | Li—Ni Base | 0.8 | 5 | Amorphous | 2 |
| 10 | Bipolar | 2 | Li—Mn Base | 2 | 10 | Amorphous | 6 |
| 11 | Bipolar | 2 | Li—Ni Base | 0.8 | 5 | Amorphous | 2 |
| 12 | Bipolar | 2 | Li—Ni Base | 0.8 | 5 | Amorphous | 2 |
| 13 | Bipolar | 2 | Li—Mn Base | 2 | 10 | Amorphous | 2 |
| 14 | Bipolar | 2 | Li—Ni Base | 2 | 10 | Amorphous | 2 |
| 15 | Bipolar | 6 | Li—Ni Base | 2 | 10 | Amorphous | 2 |
| 16 | Bipolar | 2 | Li—Ni Base | 2 | 10 | Amorphous | 2 |
| 17 | Bipolar | 12 | Li—Ni Base | 2 | 10 | Amorphous | 2 |
| 18 | Bipolar | 6 | Li—Ni Base | 2 | 10 | Amorphous | 2 |
| 19 | Bipolar | 2 | Li—Ni Base | 2 | 10 | Amorphous | 2 |
| 20 | Bipolar | 12 | Li—Ni Base | 2 | 10 | Amorphous | 2 |
| 21 | Bipolar | 6 | Li—Ni Base | 2 | 10 | Amorphous | 2 |
| 22 | Bipolar | 2 | Li—Ni Base | 2 | 10 | Amorphous | 2 |
| 23 | Bipolar | 12 | Li—Ni Base | 2 | 10 | Amorphous | 2 |
| 24 | Bipolar | 6 | Li—Ni Base | 2 | 10 | Amorphous | 2 |
| 25 | Bipolar | 2 | Li—Ni Base | 2 | 10 | Amorphous | 2 |
| 26 | Bipolar | 12 | Li—Ni Base | 2 | 10 | Amorphous | 2 |
| 27 | Bipolar | 6 | Li—Ni Base | 2 | 10 | Amorphous | 2 |
| 28 | Bipolar | 2 | Li—Ni Base | 2 | 10 | Amorphous | 2 |
| 29 | Bipolar | 12 | Li—Ni Base | 2 | 10 | Amorphous | 2 |
| 30 | Bipolar | 6 | Li—Ni Base | 2 | 10 | Amorphous | 2 |
| 31 | Bipolar | 2 | Li—Ni Base | 2 | 10 | Amorphous | 2 |
| Comparative example | | | | | | | |
| 1 | Laminate | 15 | Li—Mn Base | 2 | 10 | Amorphous | 6 |
| 2 | Laminate | 15 | Li—Mn Base | 2 | 10 | Amorphous | 6 |
| 3 | Laminate | 15 | Li—Mn Base | 2 | 10 | Amorphous | 6 |
| 4 | Bipolar | 20 | Li—Mn Base | 2 | 10 | Amorphous | 6 |
| 5 | Bipolar | 50 | Li—Mn Base | 2 | 10 | Amorphous | 6 |
| 6 | Bipolar | 100 | Li—Mn Base | 2 | 10 | Amorphous | 6 |

TABLE 2-continued

| | | | | | | | |
|---|---|---|---|---|---|---|---|
| 7 | Bipolar | 200 | Li—Mn Base | 2 | 10 | Amorphous | 6 |
| 8 | Bipolar | 2 | Li—Ni Base | 2 | 10 | Amorphous | 2 |
| 9 | Bipolar | 6 | Li—Ni Base | 2 | 10 | Amorphous | 2 |
| 10 | Bipolar | 2 | Li—Ni Base | 2 | 10 | Amorphous | 2 |

| | Negative Pole | Separator | | | |
|---|---|---|---|---|---|
| | Thickness (μm) | Material | Thickness (μm) | Shore A Hardness | Casing Material Material |
| Example | | | | | |
| 1 | 15 | Polyester | 20 | 61 | Metal Can |
| 2 | 15 | Polyester | 20 | 61 | Resin |
| 3 | 15 | Polyester | 20 | 61 | Polymer - Metal Composite Material |
| 4 | 15 | Polyester | 20 | 61 | Polymer - Metal Composite Material |
| 5 | 15 | Aramid | 15 | 90 | Polymer - Metal Composite Material |
| 6 | 10 | Polypropylene | 20 | 87 | Polymer - Metal Composite Material |
| 7 | 15 | Polyester | 20 | 61 | Polymer - Metal Composite Material |
| 8 | 10 | Polyester | 20 | 61 | Polymer - Metal Composite Material |
| 9 | 10 | Polyester | 20 | 61 | Polymer - Metal Composite Material |
| 10 | 15 | Polyester | 20 | 61 | Polymer - Metal Composite Material |
| 11 | 10 | Polyester | 20 | 61 | Polymer - Metal Composite Material |
| 12 | 10 | Polyester | 20 | 61 | Polymer - Metal Composite Material |
| 13 | 10 | Exterior: Aramid Inner: PET | Exterior: 15 Inner: 20 | Exterior: 90 Inner: 61 | Polymer - Metal Composite Material |
| 14 | 12 | Polyester (contng. Inorg.) | 10 | 65 | Polymer - Metal Composite Material |
| 15 | 12 | Polypropylene (contng. Inorg.) | 10 | 88 | Polymer - Metal Composite Material |
| 16 | 12 | Polyester (contng. Inorg.) | 10 | 65 | Polymer - Metal Composite Material |
| 17 | 12 | Aramid (contng. Inorg.) | 15 | 93 | Polymer - Metal Composite Material |
| 18 | 12 | Polypropylene (contng. Inorg.) | 10 | 65 | Polymer - Metal Composite Material |
| 19 | 12 | Polyester (contng. Inorg.) | 10 | 88 | Polymer - Metal Composite Material |
| 20 | 12 | Aramid (contng. Inorg.) | 15 | 93 | Polymer - Metal Composite Material |
| 21 | 12 | Polypropylene (contng. Inorg.) | 10 | 65 | Polymer - Metal Composite Material |
| 22 | 12 | Polyester (contng. Inorg.) | 10 | 88 | Polymer - Metal Composite Material |
| 23 | 12 | Aramid (contng. Inorg.) | 15 | 93 | Polymer - Metal Composite Material |
| 24 | 12 | Polypropylene (contng. Inorg.) | 10 | 65 | Polymer - Metal Composite Material |
| 25 | 12 | Polyester (contng. Inorg.) | 10 | 88 | Polymer - Metal Composite Material |
| 26 | 12 | Aramid (contng. Inorg.) | 15 | 93 | Polymer - Metal Composite Material |
| 27 | 12 | Polypropylene (contng. Inorg.) | 10 | 65 | Polymer - Metal Composite Material |
| 28 | 12 | Polyester (contng. Inorg.) | 10 | 88 | Polymer - Metal Composite Material |
| 29 | 12 | Aramid (contng. Inorg.) | 15 | 93 | Polymer - Metal Composite Material |
| 30 | 12 | Polypropylene (contng. Inorg.) | 10 | 65 | Polymer - Metal Composite Material |
| 31 | 12 | Polyester (contng. Inorg.) | 10 | 88 | Polymer - Metal Composite Material |
| Comparative example | | | | | |
| 1 | 15 | Polyester | 20 | 61 | Polymer - Metal Composite Material |
| 2 | 15 | Polyester | 20 | 61 | Polymer - Metal Composite Material |

TABLE 2-continued

| 3 | 15 | Polyester | 20 | 61 | Polymer - Metal Composite Material |
|---|---|---|---|---|---|
| 4 | 15 | Polyester | 20 | 61 | Polymer - Metal Composite Material |
| 5 | 15 | Polyester | 20 | 61 | Polymer - Metal Composite Material |
| 6 | 15 | Polyester | 20 | 61 | Polymer - Metal Composite Material |
| 7 | 15 | Polyester | 20 | 61 | Polymer - Metal Composite Material |
| 8 | 12 | Polyester (contng. Inorg.) | 10 | 65 | Polymer - Metal Composite Material |
| 9 | 12 | Polypropylene (contng. Inorg.) | 10 | 88 | Polymer - Metal Composite Material |
| 10 | 12 | Polyester (contng. Inorg.) | 10 | 65 | Polymer - Metal Composite Material |

The entire disclosure of Japanese Patent Application No. 2004-337490 filed on Nov. 22, 2004 and No. 2005-326870 filed on Nov. 11, 2005, including specification, claims, drawings, and summary are incorporated herein by reference in its entirety.

What is claimed is:

1. A cell structure, comprising:
   at least one electrode comprising:
   a positive pole active material layer;
   a current collector; and
   a negative pole active material layer;
   a separator provided between each electrode; and
   a casing, and satisfying the following inequality (1):

$$\frac{S}{c \times 1000} > \frac{b \times 1000}{S} \quad (1)$$

wherein b (mm) indicates a short-side length of the electrode; S (m$^2$) indicates an electrode area; c (mm) indicates a cell structure thickness; and 1000 (m$^2$/mm) is a constant, and wherein the separators have a different Shore A hardness and the separator having the lowest Shore A hardness is placed at a center of the cell structure.

2. A cell structure according to claim 1 having a bipolar structure formed by lamination of not less than 2 bipolar electrodes.

3. A cell structure according to claim 1, wherein an outer periphery length of the electrode is not less than 130 times the thickness c of the cell structure.

4. A cell structure according to claim 3, wherein the outer periphery length of the electrode is 150 to 2000 times the thickness c of the cell structure.

5. A cell structure according to claim 1, wherein an outer periphery length of the electrode is 750 to 1450 mm and the cell structure thickness c is 0.1 to 10 mm.

6. A cell structure according to claim 1, wherein the cell structure thickness c is 0.1 to 8 mm.

7. A cell structure according to claim 1, wherein a length of the diagonal lines of the electrode is 260 to 550 mm, and an acute angle formed by the diagonal lines of the electrode is not less than 60° and not more than 90°.

8. A cell structure according to claim 1, wherein the casing is made of a polymer-metal composite material.

9. A cell structure according to claim 1, wherein the Shore A hardness of the separators is in the range of 20 to 110.

10. A cell structure according to claim 9, wherein the separators comprises at least one member selected from a group consisting of a polyester-based resin, an aramid-based resin, a polypropylene-based resin, an inorganic material containing polyester-based resin, an inorganic material containing polypropylene-based resin, and an inorganic material containing aramid-based resin.

11. A cell structure according to claim 1, wherein an average particle diameter of a positive pole active material forming the positive pole active material layer is not larger than 2 μm.

12. A cell structure according to claim 1, wherein a positive pole active material forming the positive active material layer comprises a Li-Mn based complex oxide and /or a Li-Ni based complex oxide.

13. A cell structure according to claim 1, wherein an average particle diameter of the negative pole active material forming the negative pole active material layer is not larger than 2 μm.

14. A cell structure according to claim 1, wherein an negative pole active material forming the negative pole active material layer comprises a crystalline carbon material and /or an amorphous carbon material.

15. A cell structure according to claim 9, wherein a passage curvature of the separator is 0.5 to 2.0.

16. A combined cell formed by connecting, in series and/or parallel, not less than 2 cell structures according to claim 1.

17. A vehicle equipped with the cell structure according to claim 1.

18. A vehicle equipped with the combined cell according to claim 16.

19. A cell structure according to claim 1, wherein the separator holds an electrolyte to form an electrolyte layer.

* * * * *

UNITED STATES PATENT AND TRADEMARK OFFICE
CERTIFICATE OF CORRECTION

PATENT NO. : 7,659,030 B2
APPLICATION NO. : 11/284089
DATED : February 9, 2010
INVENTOR(S) : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Thirtieth Day of November, 2010

David J. Kappos
*Director of the United States Patent and Trademark Office*